H. T. KRAKAU.
CAR COUPLING.
APPLICATION FILED AUG. 6, 1910.
1,169,265.
Patented Jan. 25, 1916.
4 SHEETS—SHEET 1.
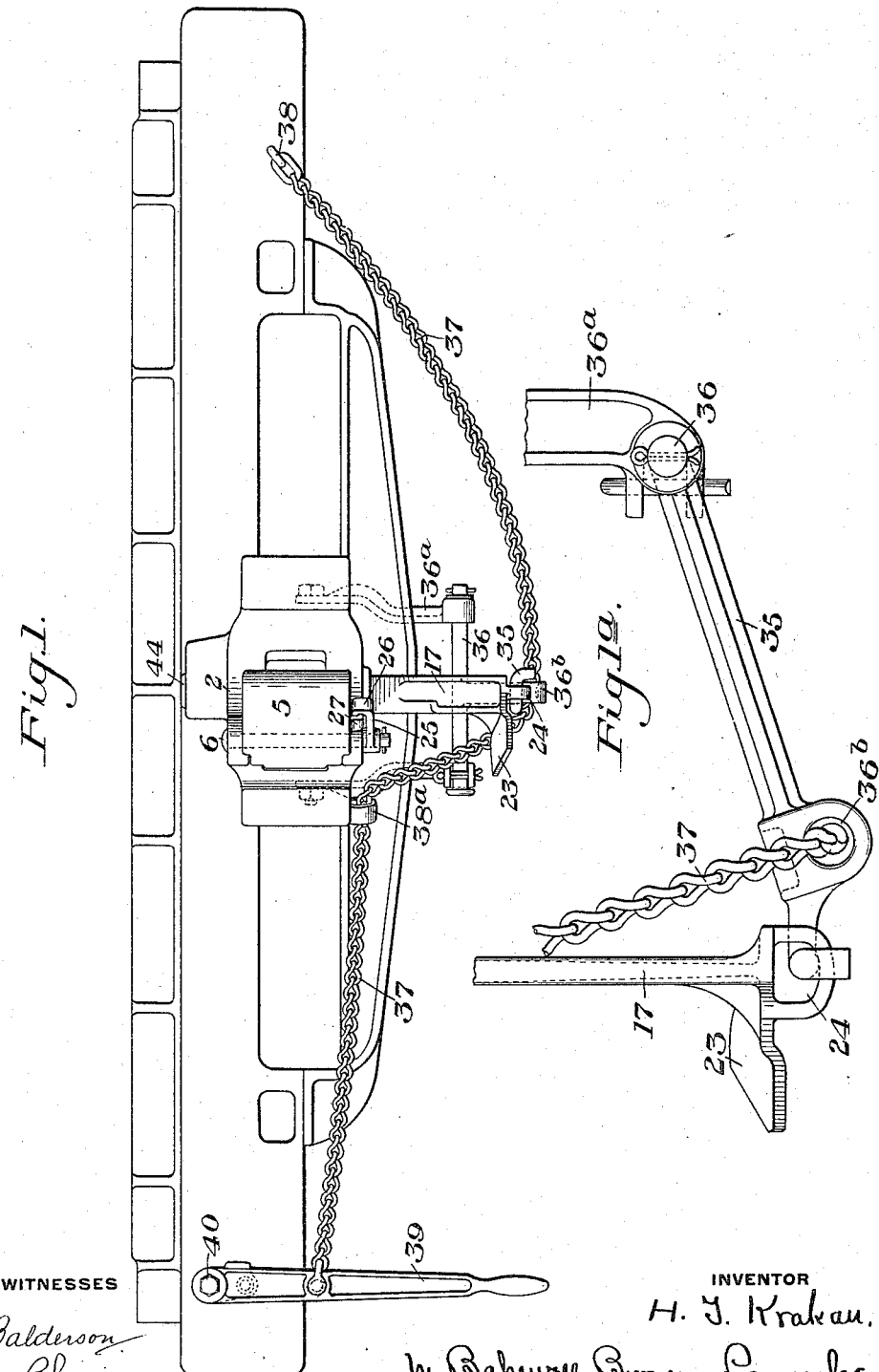
WITNESSES
INVENTOR
H. T. Krakau.
by Bakewell, Byrnes & Parmelee,
his Attys H. T. KRAKAU.
CAR COUPLING.
APPLICATION FILED AUG. 6, 1910.
1,169,265.
Patented Jan. 25, 1916.
4 SHEETS—SHEET 2.
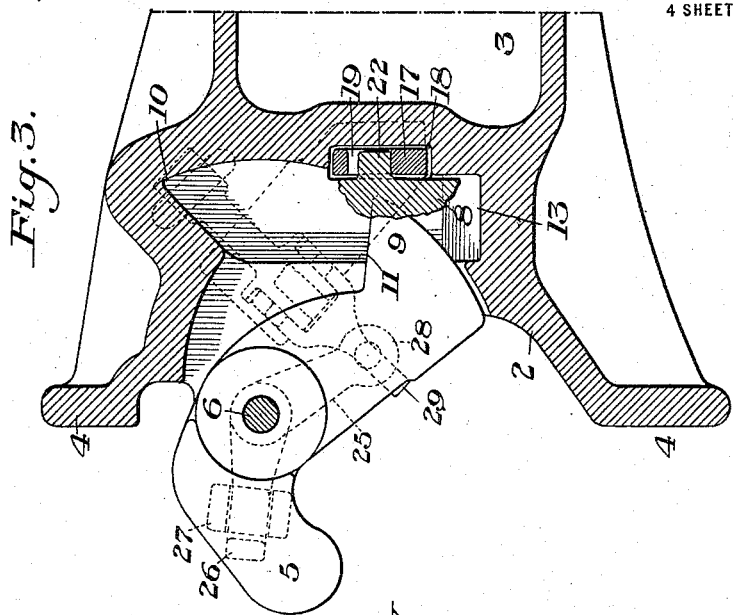
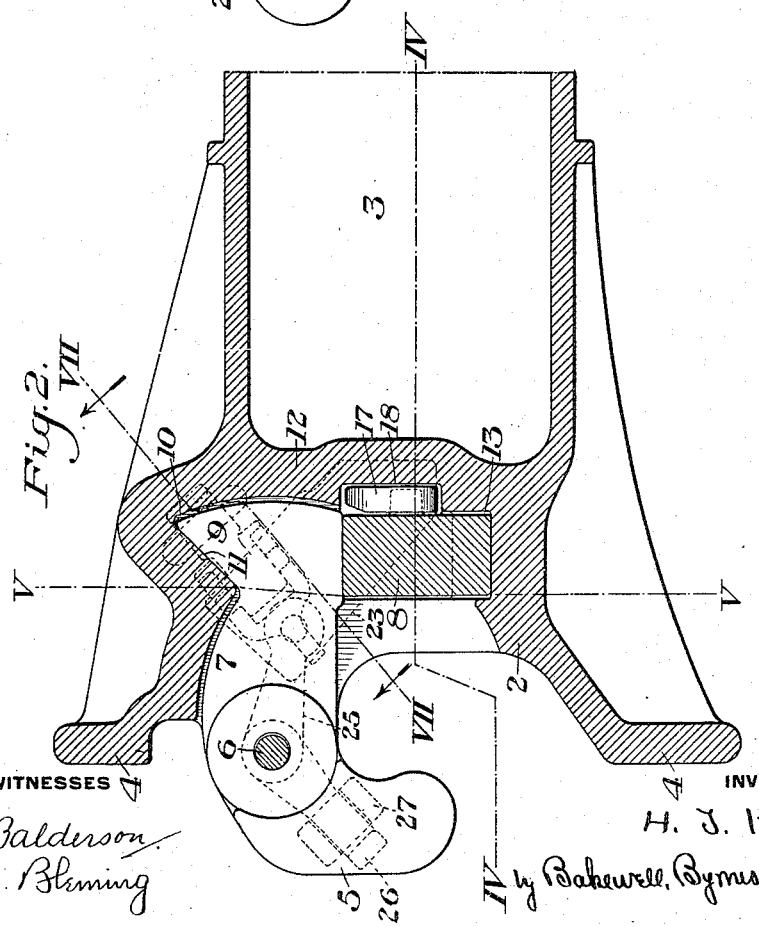

H. T. KRAKAU.
CAR COUPLING.
APPLICATION FILED AUG. 6, 1910.
1,169,265.
Patented Jan. 25, 1916.
4 SHEETS—SHEET 3.
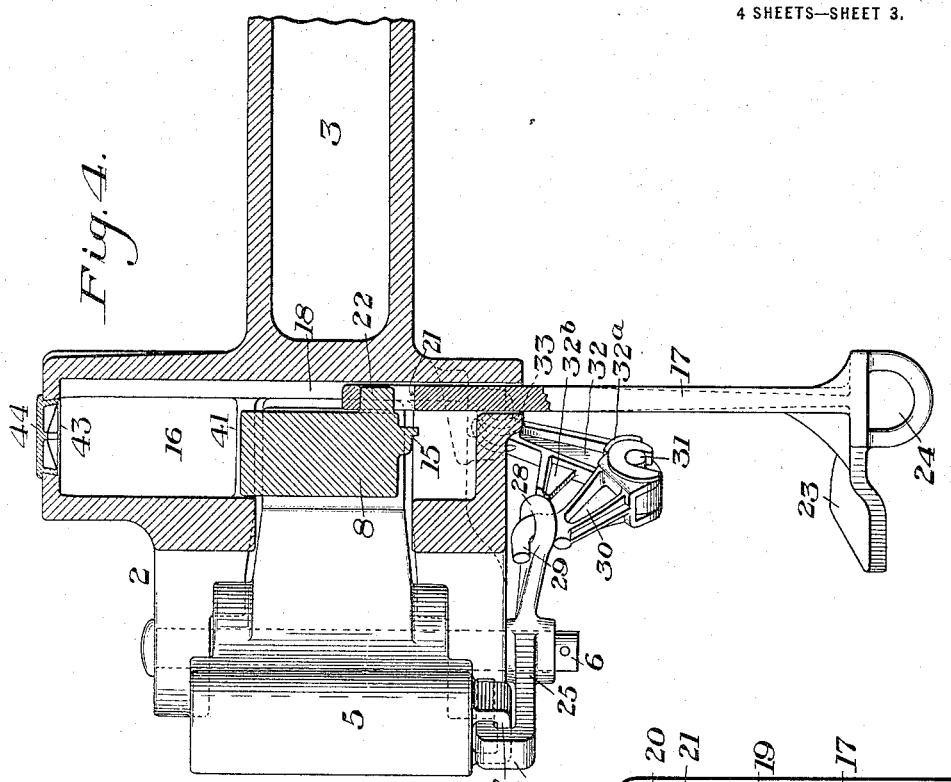
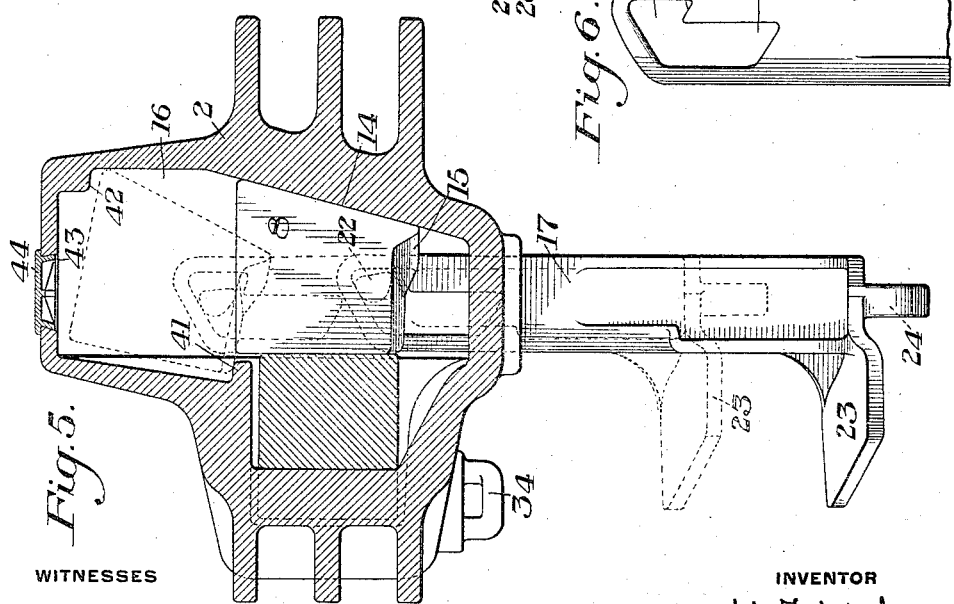
WITNESSES
R. A. Balderson
G. B. Bleming
INVENTOR
H. T. Krakau.
by Bakewell, Byrnes Parmelee
his Attys.

H. T. KRAKAU.
CAR COUPLING.
APPLICATION FILED AUG. 6, 1910.
1,169,265.
Patented Jan. 25, 1916.
4 SHEETS—SHEET 4.
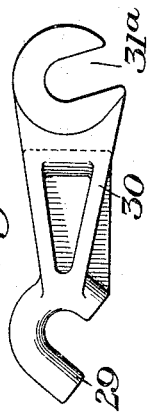
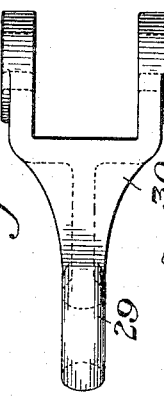
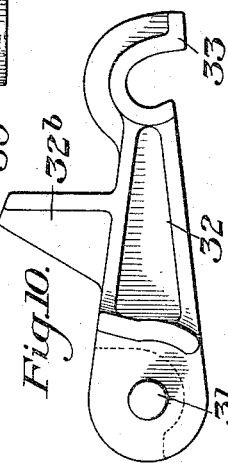
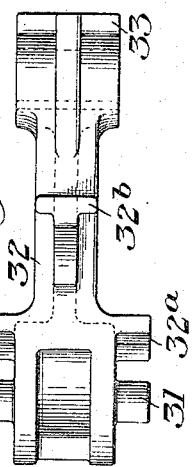
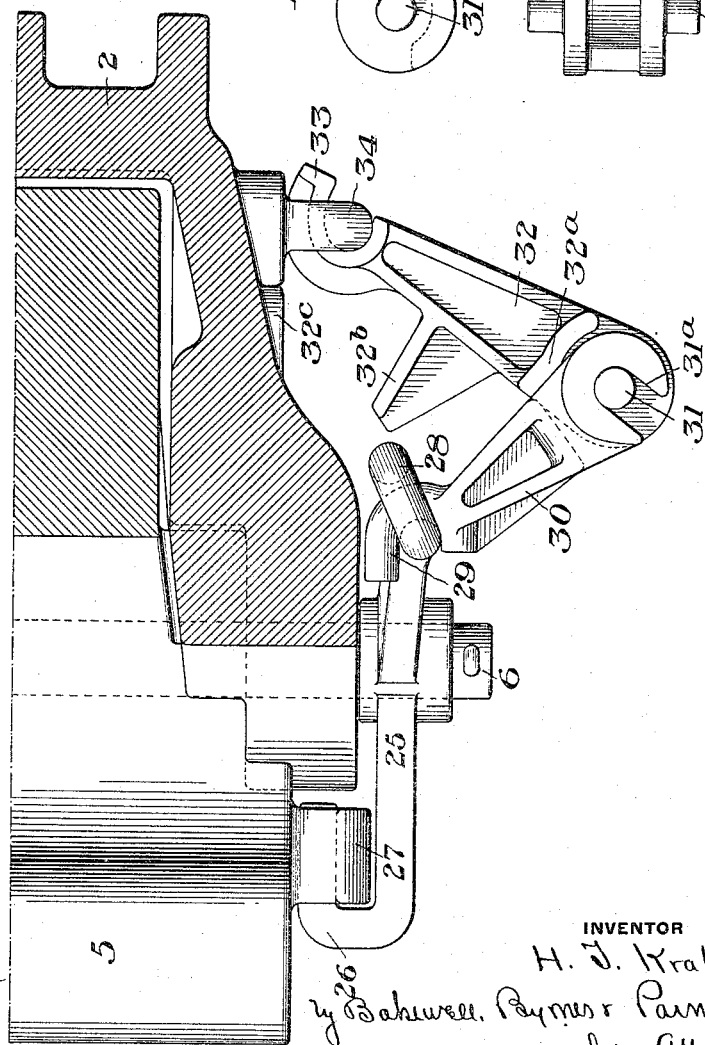

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

CAR-COUPLING.

1,169,265.  Specification of Letters Patent.  Patented Jan. 25, 1916.

Application filed August 6, 1910. Serial No. 575,956.

*To all whom it may concern:*

Be it known that I, HARRY T. KRAKAU, a resident of Cleveland, in the county of Cuyahoga and State of Ohio, have invented a new and useful Improvement in Car-Couplings, of which the following is a full, clear, and exact description, reference being had to the accompanying drawings, forming part of this specification, in which:

Figure 1 is a front elevation of a portion of a car showing my improved coupling applied thereto; Fig. 1ª is a detail view of a portion of the operating mechanism; Figs. 2 and 3 are horizontal sections showing the knuckle in the locked and thrown positions, respectively; Fig. 4 is a vertical section on the line IV—IV of Fig. 2, with the knuckle in its locked position; Fig. 5 is a transverse section on the line V—V of Fig. 2; Fig. 6 is a detail view of a portion of the lock-lifting member; Fig. 7 is a section on the larger scale taken on the line VII—VII of Fig. 2; and Figs. 8, 9, 10 and 11 are detail views of the parts of the knuckle-throwing mechanism hereinafter more fully described.

My invention has relation to car couplers of the automatic type, and is designed to provide a coupler of this class having largely increased strength.

A further object of the invention is to greatly simplify the design, manufacture and construction of the several parts of the coupler, for the purpose of obtaining increased strength and durability.

A still further object is to provide novel and effective locking, lock-lifting, locksetting and knuckle-throwing devices, the knuckle-throwing devices being arranged exteriorly of the coupler-head, thereby obviating all cam or lever actions within the head which require a special configuration of the head and knuckle, to permit their reception and operation and which weaken and complicate the construction.

Other objects and advantages of my invention will hereinafter appear.

Referring to the accompanying drawings, in which I have shown the preferred form of my invention, the numeral 2 designates a coupler head, which is carried by the hollow shank 3. This head is shown as having laterally extending buffing wings 4, but my invention is not limited in this respect, since it may be applied to heads in which these extended buffing faces are not present.

The numeral 5 designates the knuckle which is pivotally mounted on the pin 6. The hook or coupling portion of this knuckle is of substantially the usual form, but its tail portion is considerably modified. The rear side of the tail is provided with the curved or convex portion 7, while the front side is substantially parallel with the line of draft and is straight, except that it is preferably slightly thickened where it contacts with the lock 8. The enlarged rear portion 9 of the knuckle-tail has a face 11, preferably inclined at an angle of forty-five degrees to the line of draft, which engages a corresponding surface 10 in the head. The purpose of this wedge-shaped tail with rearwardly diverging sides is to transmit the pulling strains directly to the coupler-head and lock, and thus relieve the pin 6. The rear end of the knuckle-tail is preferably curved on a radius taken from the center of the pin 6.

The wall of the knuckle chamber of the head is made of thick solid metal, and the rear side of the knuckle cavity is entirely closed by the wall 12.

The lock 8 consists of a solid vertically movable block which is rectangular in cross section with its greatest dimension at right angles to the line of draft. In the locking position, this lock seats between the straight edge of the knuckle-tail and the opposite wall of the knuckle cavity, the latter being preferably recessed, as shown at 13, to seat and guide the lock. The side of the lock engaging the locking face of the coupler is tapered downwardly in the manner best shown at 14, in Fig. 5, so as to give it a wedging action and also cause it to free itself more readily when lifted, the abutting wall of the coupler head having a corresponding inclination. The lower end of the lock has a rib or projection 15 thereon, which coöperates with the knuckle-tail in the manner hereinafter described for moving the lock from its lockset position. In unlocking, the lock is arranged to be moved upwardly into a vertically offset chamber 16 in the upper portion of the coupler head.

The numeral 17 designates the lock-lifter, which is mounted to slide vertically behind the lock in a recess 18, cut in the forward side of the wall 12. The lock-lifter is formed at its upper end portion with a slot or opening 19, having the lateral offset 20, with a shoulder 21 (see Fig. 6).

The slot or opening 19 engages a rearward projection 22 at the lower rear side of the lock, and the lock lifter normally hangs on its projection in the manner shown in Fig. 4, with its lower end projecting downwardly below the coupler head. The lower end portion is formed with a forwardly projecting member 23 and also with an eye 24, for the purpose presently described.

The numeral 25 designates a bell crank lever, which is loosely fulcrumed on the lower propecting end of the knuckle pin 6. This lever has a forwardly projecting arm formed into a hook 26, which engages an opening in a downwardly projecting lug 27, on the bottom of the knuckle. The bell crank lever also has a rearwardly projecting arm formed with an eye 28, which loosely engages a hook 29, at the upper end portion of a toggle member 30. The lower end of the toggle member 30 is pivotally connected with another toggle member 32, whose upper end is formed with a hook portion 33, which loosely engages an eye 34, depending from the lower rear portion of the coupler head.

The pivotal connection between the toggles is shown as being formed by means of integral pins 31, on the member 32, which are loosely engaged by the open slot-bearings 31ª on the member 30. The member 32 has the projecting flanges 32ª which engage the upper edge of the member 30, to limit the buckling movement of the toggles and to lock the members together. The member 32 also has a projection 32ᵇ which, by contact with a boss 32ᶜ on the under side of the coupler head, prevents the toggles being moved upwardly beyond their dead center.

The numeral 35 designates a lever, which is pivoted at its rear end to a transversely extending shaft 36, carried by brackets 36ª, which depend from the coupler head. The forward end of this lever is loosely engaged with the eye 24 of the lock lifter, before described. The lever 35 also has an eye 36ᵇ, through which passes a chain 37. One end of this chain is shown as having a fixed connection 38 to the end sill of the car at one side of the coupler, while the other end passes upwardly from the eye 36ᵇ, thence through a guide 38ª, and thence to an operating lever 39, which is pivoted at 40 to the end sill of the car.

The operation is as follows: In the locked position, it will be seen from Figs. 2 and 5 that the lock 8 holds the knuckle firmly and positively in its coupling position, the lock being so placed as to most effectively receive the pulling strains tending to cause any opening movement of the knuckle. To release the lock, the lever 39 is moved to the left (looking at Fig. 1) thereby causing a pull on the chain 37. This pull exerts an upward lift on the lever 35, which, in turn, raises the lock lifter 17, causing the shoulder 21 on the latter to exert a lifting action on the lock. The lock is thus moved upwardly to the position shown in dotted lines in Fig. 5. The upper end of the lock strikes an inwardly projecting shoulder 42 at the side of the head and is thus forced to tip laterally, as shown in dotted lines in Fig. 5, and thus disengage the shoulder 21 of the lifter from the lug or projection 22 of the lock. At the same time, the lock comes into engagement with the locksetting projection 41 of the coupler head, and is thus supported in its locksetting position. If, instead of raising the lock into locksetting position, it is desired to open the knuckle, the chain 37 is pulled by operating the lever 39, thereby lifting the lock. When the lock is tipped on to the locksetting projection 41, the shoulder 21 of the lifter and the lug 22 of the lock will be disengaged, thus permitting further upward movement of the lifter without lifting the lock. As the lifter is further raised, its portion 23 engages the pivoted ends of the toggles 30 and 32. When this occurs, the toggles are moved upwardly, thereby tending to straighten them, and this causes a movement of the bell crank lever 25, which opens the knuckle. As the knuckle swings to open position, the upper surface of the knuckle tail contacts with the rib 15 on the lower end of the locking block and moves the knuckle from its lockset position into a position where it rides on the knuckle-tail. The lock is supported on the knuckle-tail during the further opening movement of the knuckle and during its closing movement, after which it falls by gravity to its locking position.

The advantages of my invention will be readily apparent. The shape of the knuckle-tail and of the interior of the knuckle cavity is such as to permit of a maximum amount of metal in both the knuckle walls of the head, thereby giving great strength as well as simplicity of design. By arranging the knuckle-throwing mechanism entirely exterior of the head, I obviate the necessity for any cam or lever means within the head, which not only require added space for their operation, but which complicate the design and weaken the construction of the parts. The provision for lifting the lock lifter independently of the lock beyond the locksetting position enables me to use the lock-lifter for knuckle-throwing without adding space at the top of the coupler-head which would otherwise be required to receive the lock when raised above the locksetting position.

The lock may also be operated from the top instead of from the bottom, and for this purpose, the head is preferably provided with an opening 43, through which a suitable top-operating connection may be made with the lock. This hole is normally closed by a plug or cap 44.

Various changes may be made in the arrangement of parts which I have described and shown herein, without departing from my invention, since

I claim:

1. A car coupler having a head, a pivoted knuckle, a lock, a lock-lifting device, actuating connections between the lock and the lock-lifting device, a toggle connected to the coupler head and also to the knuckle, and means on the lock lifter for actuating the toggle, substantially as described.

2. A car coupler having a head, a pivoted knuckle, a lock, a lock-lifting device, actuating connections between the lock and the lock-lifting device, and a toggle pivoted to the coupler head and connected to the knuckle, the lock-lifter having a part coöperating with the toggle, a part of the head co-acting with the lock to move the lock to release it from its operative connection with the lock lifter for lock-setting, the lifter being adapted to be raised after disconnection with the lock to actuate the toggle and thereby throw the knuckle, substantially as described.

3. A car coupler having a head, a pivoted knuckle, a lock, a lock-lifting device, actuating connections between the lock and the lock-lifting device, members forming a toggle joint pivoted to the coupler head, and a bell crank lever forming a connection between one of said toggle members and the knuckle, substantially as described.

4. A car coupler having a pivoted knuckle and a lock, a lifter engaging the lock, and a knuckle-throwing member actuated by the lifter and comprising a bell crank lever pivoted on the knuckle pin and engaging the knuckle, substantially as described.

5. In a car coupler, a coupler head, a knuckle pivoted thereto, a lock, a lock lifter, a toggle device for throwing the knuckle, said toggle device forming an elbow joint, and means on the lock lifter adapted to engage the elbow joint and throw the knuckle, substantially as described.

6. A car coupler having a pivoted knuckle and a lock, a lifter engaging the lock, actuating mechanism for the knuckle comprising a toggle joint, a connection between the toggle joint and the knuckle, the said lifter being adapted to engage the elbow on the toggle joint to cause the members of said joint to change their angular relation and throw the knuckle, substantially as described.

7. A car coupler having a pivoted knuckle and a lock, a lock lifting member engaging the lock and having a shelf near its lower end for actuating knuckle throwing mechanism, said knuckle throwing mechanism being comprised of a toggle joint connected to said knuckle, the said shelf being arranged to strike the elbow of the toggle joint in its upward movement to throw the knuckle, substantially as described.

In testimony whereof, I have hereunto set my hand.

HARRY T. KRAKAU.

Witnesses:
HARRY E. ORR,
F. W. SWENSTON.

Copies of this patent may be obtained for five cents each, by addressing the "Commissioner of Patents. Washington, D. C."